United States Patent
Blumenkranz et al.

(10) Patent No.: US 12,496,218 B1
(45) Date of Patent: Dec. 16, 2025

(54) FRACTIONATED TOPICAL OCULAR DRUG DELIVERY METHODS AND DEVICES FOR USE IN THE SAME

(71) Applicant: Bausch + Lomb Ireland Limited, Dublin (IE)

(72) Inventors: Mark S. Blumenkranz, Portola Valley, CA (US); Yehuda Ivri, Newport Coast, CA (US); Reynaldo Quintana, Menlo Park, CA (US); Daniel V. Palanker, Sunnyvale, CA (US)

(73) Assignee: Bausch + Lomb Ireland Limited, Dublin (IE)

( * ) Notice: Subject to any disclaimer, the term of this patent is extended or adjusted under 35 U.S.C. 154(b) by 75 days.

(21) Appl. No.: 17/096,348

(22) Filed: Nov. 12, 2020

Related U.S. Application Data (60) Provisional application No. 63/049,582, filed on Jul. 8, 2020, provisional application No. 63/049,110, filed
(Continued)

(51) Int. Cl.
| | |
|---|---|
| *A61F 9/00* | (2006.01) |
| *G16H 20/13* | (2018.01) |
| *G16H 40/67* | (2018.01) |

(52) U.S. Cl.
CPC .......... *A61F 9/0008* (2013.01); *G16H 20/13* (2018.01); *G16H 40/67* (2018.01)

(58) Field of Classification Search
CPC .......... A61F 9/00; A61F 9/008; A61F 9/0008; A61F 9/0017; A61M 31/00; G16H 20/13; G16H 40/67; G02B 5/10
See application file for complete search history.

(56) References Cited

U.S. PATENT DOCUMENTS

| | | | |
|---|---|---|---|
| 3,640,274 | A | 2/1972 | Costello |
| 3,779,245 | A | 12/1973 | Windsor |
(Continued)

FOREIGN PATENT DOCUMENTS

| | | |
|---|---|---|
| CN | 103118642 A | 5/2013 |
| CN | 104146816 A | 11/2014 |
(Continued)

OTHER PUBLICATIONS

Denion, Eric MD, PhD et al, A 5-Minute Interval between Two Dilating Eye Drops Increases Their Effect; Optometry and Vision Science, vol. 94, Issue 8 p. 838-844, Jul. 19, 2017 (Year: 2017).*
(Continued)

*Primary Examiner* — Adam Marcetich
*Assistant Examiner* — Timothy L Flynn
(74) *Attorney, Agent, or Firm* — Perilla Knox & Hildebrandt LLP; Stephanie Davy-Jow; Bradley K. Groff (57) ABSTRACT

The efficacy of a dosing regimen can be altered, and preferably improved, by fractionating the doses. Here fractionating the doses can be regarded as taking a single conventional dose and splitting that dose into two or more dose-fractions delivered at relatively short time intervals, where the dose-fractions add up to the same total dose as the conventional dose. In cases where dose fractionation increases the therapeutic effect, this can result in a greater therapeutic effect from a smaller total dose when the doses are fractionated. This effect has been demonstrated in an ophthalmic application, but is expected to be more generally applicable.

20 Claims, 6 Drawing Sheets

Related U.S. Application Data on Jul. 7, 2020, provisional application No. 63/011,808, filed on Apr. 17, 2020, provisional application No. 63/011,800, filed on Apr. 17, 2020, provisional application No. 62/951,903, filed on Dec. 20, 2019, provisional application No. 62/934,225, filed on Nov. 12, 2019.

(56) References Cited

U.S. PATENT DOCUMENTS

| | | | |
|---|---|---|---|
| 3,812,854 A | 5/1974 | Michaels et al. | |
| 3,826,258 A * | 7/1974 | Abraham | A61K 9/0051 604/295 |
| 3,861,386 A | 1/1975 | Harris et al. | |
| 3,934,585 A | 1/1976 | Maurice | |
| 3,970,250 A | 7/1976 | Drews | |
| 3,976,072 A | 8/1976 | Walker | |
| 4,159,803 A | 7/1979 | Cameto et al. | |
| 4,300,546 A | 11/1981 | Kruber | |
| 4,334,531 A | 6/1982 | Reichl et al. | |
| 4,338,576 A | 7/1982 | Takahashi et al. | |
| 4,344,744 A | 8/1982 | Schuster et al. | |
| 4,352,459 A | 10/1982 | Berger et al. | |
| 4,465,234 A | 8/1984 | Maehara et al. | |
| 4,632,311 A | 12/1986 | Nakane et al. | |
| 4,655,393 A | 4/1987 | Berger et al. | |
| 4,793,339 A | 12/1988 | Matsumoto et al. | |
| 4,850,534 A | 7/1989 | Takahashi et al. | |
| 4,882,150 A | 11/1989 | Kaufman | |
| 4,952,581 A | 8/1990 | Bito et al. | |
| 4,961,345 A | 10/1990 | Tsuruoka et al. | |
| 4,976,259 A | 12/1990 | Higson et al. | |
| 4,981,625 A | 1/1991 | Rhim et al. | |
| 5,025,957 A | 6/1991 | Ranalletta et al. | |
| 5,171,306 A | 12/1992 | Vo | |
| 5,232,363 A | 8/1993 | Meller | |
| 5,368,582 A | 11/1994 | Bertera | |
| 5,370,317 A | 12/1994 | Weston | |
| 5,487,378 A | 1/1996 | Robertson et al. | |
| 5,549,249 A | 8/1996 | Foster et al. | |
| 5,624,057 A | 4/1997 | Lifshey | |
| 5,627,611 A | 5/1997 | Scheiner | |
| 5,630,793 A | 5/1997 | Rowe | |
| 5,657,926 A | 8/1997 | Toda | |
| 5,692,651 A | 12/1997 | Fuchs | |
| 5,811,443 A | 9/1998 | DeSantis, Jr. et al. | |
| 5,828,394 A | 10/1998 | Khuri-Yakub et al. | |
| 5,938,117 A | 8/1999 | Ivri | |
| 5,958,342 A | 9/1999 | Gamble et al. | |
| 5,960,224 A | 9/1999 | Sanada et al. | |
| 6,024,717 A | 2/2000 | Ball et al. | |
| 6,062,212 A | 5/2000 | Davison et al. | |
| 6,065,623 A | 5/2000 | Hierzer et al. | |
| 6,095,376 A | 8/2000 | Hennemann et al. | |
| 6,196,218 B1 | 3/2001 | Voges | |
| 6,232,129 B1 | 5/2001 | Wiktor | |
| 6,273,092 B1 | 8/2001 | Nolan | |
| 6,302,101 B1 | 10/2001 | Py | |
| 6,419,663 B2 | 7/2002 | Harrold | |
| 6,467,476 B1 | 10/2002 | Ivri et al. | |
| RE38,077 E | 4/2003 | Cohen et al. | |
| 6,543,442 B2 | 4/2003 | Gonda et al. | |
| 6,629,646 B1 | 10/2003 | Ivri | |
| 6,730,066 B1 | 5/2004 | Bennwik et al. | |
| 6,758,837 B2 | 7/2004 | Peclat et al. | |
| 6,869,275 B2 | 3/2005 | Dante et al. | |
| 7,066,398 B2 | 6/2006 | Borland et al. | |
| 7,105,357 B1 | 9/2006 | Kalkum et al. | |
| 7,201,732 B2 | 4/2007 | Anderson et al. | |
| 7,314,938 B2 | 1/2008 | Shen et al. | |
| 7,571,722 B2 | 8/2009 | Wuttke et al. | |
| 7,745,460 B2 | 6/2010 | Shen et al. | |
| 7,790,743 B2 | 9/2010 | Shen et al. | |
| 7,874,467 B2 | 1/2011 | Pardes et al. | |
| 7,883,031 B2 | 2/2011 | Collins, Jr. et al. | |
| 7,928,122 B2 | 4/2011 | Shen et al. | |
| 8,012,136 B2 | 9/2011 | Collins, Jr. et al. | |
| 8,048,047 B2 | 11/2011 | Domash | |
| 8,056,766 B2 | 11/2011 | Grevin | |
| 8,128,606 B2 | 3/2012 | Anderson et al. | |
| 8,133,210 B2 | 3/2012 | Al-Abdulla et al. | |
| 8,144,399 B2 | 3/2012 | Steenblik et al. | |
| 8,168,655 B2 | 5/2012 | Gadek et al. | |
| 8,273,307 B2 | 9/2012 | Eickhoff et al. | |
| 8,367,701 B2 | 2/2013 | Burnier et al. | |
| 8,398,001 B2 | 3/2013 | Borland et al. | |
| 8,435,544 B2 | 5/2013 | Mitra et al. | |
| 8,544,462 B2 | 10/2013 | Papania et al. | |
| 8,545,463 B2 | 10/2013 | Collins, Jr. et al. | |
| 8,592,450 B2 | 11/2013 | Gadek et al. | |
| 8,629,111 B2 | 1/2014 | Acheampong et al. | |
| 8,633,162 B2 | 1/2014 | Acheampong et al. | |
| 8,642,556 B2 | 2/2014 | Acheampong et al. | |
| 8,648,048 B2 | 2/2014 | Acheampong et al. | |
| 8,684,980 B2 | 4/2014 | Hunter et al. | |
| 8,685,930 B2 | 4/2014 | Acheampong et al. | |
| 8,722,728 B2 | 5/2014 | Wong et al. | |
| 8,733,935 B2 | 5/2014 | Ballou, Jr. et al. | |
| 8,863,998 B2 | 10/2014 | Painchaud et al. | |
| 8,927,574 B2 | 1/2015 | Burnier | |
| 8,927,921 B1 | 1/2015 | Nelms | |
| 8,936,021 B2 | 1/2015 | Collins, Jr. | |
| 9,039,666 B2 | 5/2015 | Voss et al. | |
| 9,068,566 B2 | 6/2015 | Ivri | |
| 9,085,553 B2 | 7/2015 | Zeller et al. | |
| 9,087,145 B2 | 7/2015 | Ballou, Jr. et al. | |
| 9,186,690 B2 | 11/2015 | Scanlon et al. | |
| 9,216,174 B2 | 12/2015 | Shen et al. | |
| 9,238,532 B2 | 1/2016 | Decock et al. | |
| 9,248,191 B2 | 2/2016 | Acheampong et al. | |
| 9,353,088 B2 | 5/2016 | Burnier | |
| 9,447,077 B2 | 9/2016 | Burnier et al. | |
| 9,597,230 B2 | 3/2017 | Haffner et al. | |
| 9,676,525 B2 | 6/2017 | Greiner-Perth et al. | |
| 9,700,686 B2 | 7/2017 | Gavini et al. | |
| 9,801,757 B2 | 10/2017 | Voss et al. | |
| 9,808,825 B2 | 11/2017 | Aguilar et al. | |
| 9,867,933 B2 | 1/2018 | Pardes et al. | |
| 9,890,141 B2 | 2/2018 | Burnier | |
| 10,073,949 B2 | 9/2018 | Ballou, Jr. et al. | |
| 10,105,720 B2 | 10/2018 | Decock et al. | |
| 10,124,000 B2 | 11/2018 | Shen et al. | |
| 10,154,923 B2 | 12/2018 | Hunter et al. | |
| 10,174,017 B2 | 1/2019 | deLong et al. | |
| 10,314,740 B2 | 6/2019 | Kraft | |
| 10,624,781 B2 | 4/2020 | Ivri | |
| 11,278,448 B2 | 3/2022 | Palanker et al. | |
| 2001/0035184 A1 | 11/2001 | Schuler et al. | |
| 2001/0036424 A1 | 11/2001 | Takahashi et al. | |
| 2001/0036449 A1 | 11/2001 | Garst | |
| 2002/0078947 A1 | 6/2002 | Gumaste | |
| 2002/0124843 A1 | 9/2002 | Skiba et al. | |
| 2002/0158196 A1 | 10/2002 | Berggren et al. | |
| 2002/0161344 A1 | 10/2002 | Peclat et al. | |
| 2002/0185125 A1 | 12/2002 | Klimowicz et al. | |
| 2002/0190079 A1 | 12/2002 | Hamamoto | |
| 2003/0052573 A1 | 3/2003 | Wischnewskiy | |
| 2003/0065294 A1 | 4/2003 | Pickup et al. | |
| 2003/0071071 A1 | 4/2003 | Garcia et al. | |
| 2003/0140921 A1 | 7/2003 | Smith et al. | |
| 2004/0039355 A1 | 2/2004 | Gonzalez et al. | |
| 2004/0050861 A1 | 3/2004 | Lisec et al. | |
| 2004/0138630 A1 | 7/2004 | Al-Abdulla et al. | |
| 2004/0163645 A1 | 8/2004 | Connelly et al. | |
| 2004/0173642 A1 * | 9/2004 | Clifford | A61F 9/0008 222/420 |
| 2004/0204674 A1 | 10/2004 | Anderson et al. | |
| 2004/0215157 A1 | 10/2004 | Peclat et al. | |
| 2004/0256487 A1 | 12/2004 | Collins, Jr. et al. | |
| 2004/0263567 A1 | 12/2004 | Hess et al. | |
| 2005/0001981 A1 | 1/2005 | Anderson et al. | |
| 2005/0006417 A1 | 1/2005 | Nicol et al. | |
| 2005/0107832 A1 | 5/2005 | Bernabei | |
| 2005/0172962 A1 | 8/2005 | Gumaste et al. | |

(56) References Cited

U.S. PATENT DOCUMENTS

| | | |
|---|---|---|
| 2005/0207917 A1 | 9/2005 | Koerner et al. |
| 2005/0240162 A1 | 10/2005 | Chen et al. |
| 2005/0261641 A1 | 11/2005 | Warchol et al. |
| 2006/0065677 A1 | 3/2006 | Py et al. |
| 2006/0069358 A1 | 3/2006 | Gerondale |
| 2006/0147313 A1 | 7/2006 | Zengerle et al. |
| 2006/0210604 A1 | 9/2006 | Dadey et al. |
| 2007/0051362 A1 | 3/2007 | Sullivan et al. |
| 2007/0088267 A1 | 4/2007 | Shekalim |
| 2007/0088268 A1 | 4/2007 | Edwards |
| 2007/0102455 A1 | 5/2007 | Stark et al. |
| 2007/0119969 A1 | 5/2007 | Collins, Jr. et al. |
| 2007/0195151 A1 | 8/2007 | Anderson et al. |
| 2007/0268340 A1 | 11/2007 | Dacquay et al. |
| 2007/0295332 A1 | 12/2007 | Ziegler et al. |
| 2008/0039807 A1 | 2/2008 | Pine |
| 2008/0202514 A1 | 8/2008 | Kriksunov et al. |
| 2008/0214940 A1 | 9/2008 | Benaron et al. |
| 2008/0233053 A1 | 9/2008 | Gross et al. |
| 2008/0247264 A1 | 10/2008 | Gabl et al. |
| 2008/0257911 A1 | 10/2008 | Choi et al. |
| 2009/0060793 A1 | 3/2009 | Eickhoff et al. |
| 2009/0114742 A1 | 5/2009 | Collins, Jr. |
| 2009/0134235 A1 | 5/2009 | Ivri |
| 2009/0182291 A1 | 7/2009 | Eilat |
| 2009/0192443 A1 | 7/2009 | Collins, Jr. |
| 2009/0212127 A1 | 8/2009 | Reynolds et al. |
| 2009/0212133 A1 | 8/2009 | Collins, Jr. |
| 2009/0223513 A1 | 9/2009 | Papania et al. |
| 2010/0001090 A1 | 1/2010 | Neergaard et al. |
| 2010/0005903 A1 | 1/2010 | Beavis |
| 2010/0013352 A1 | 1/2010 | Pletner et al. |
| 2010/0044460 A1 | 2/2010 | Sauzade |
| 2010/0072301 A1 | 3/2010 | Cater |
| 2010/0072302 A1 | 3/2010 | Cater |
| 2010/0076388 A1 | 3/2010 | Cater |
| 2010/0147899 A1 | 6/2010 | Nardi |
| 2010/0186738 A1 | 7/2010 | Kobayashi et al. |
| 2010/0222752 A1 | 9/2010 | Collins, Jr. et al. |
| 2010/0236545 A1 | 9/2010 | Kern |
| 2010/0295420 A1 | 11/2010 | Wierach |
| 2010/0326431 A1 | 12/2010 | Yu |
| 2011/0074247 A1 | 3/2011 | Hohlfeld et al. |
| 2011/0102735 A1 | 5/2011 | Gupta et al. |
| 2011/0106025 A1 | 5/2011 | Hall et al. |
| 2011/0146670 A1 | 6/2011 | Gallem et al. |
| 2011/0284579 A1 | 11/2011 | Pardes et al. |
| 2011/0293452 A1 | 12/2011 | Kim et al. |
| 2011/0305425 A1 | 12/2011 | Fabrykowski et al. |
| 2012/0017898 A1 | 1/2012 | Moller |
| 2012/0062840 A1 | 3/2012 | Ballou, Jr. et al. |
| 2012/0070467 A1 | 3/2012 | Ballou, Jr. et al. |
| 2012/0143152 A1 | 6/2012 | Hunter et al. |
| 2012/0179122 A1 | 7/2012 | Eilat et al. |
| 2012/0197219 A1 | 8/2012 | Scanlon et al. |
| 2012/0304929 A1 | 12/2012 | Ivri |
| 2013/0002095 A1 | 1/2013 | Van der Linden |
| 2013/0017283 A1 | 1/2013 | Zemel et al. |
| 2013/0025038 A1 | 1/2013 | Frey |
| 2013/0053042 A1 | 2/2013 | Tanikawa et al. |
| 2013/0079733 A1 | 3/2013 | Burt et al. |
| 2013/0118619 A1 | 5/2013 | Loth et al. |
| 2013/0140225 A1 | 6/2013 | Decock et al. |
| 2013/0150812 A1 | 6/2013 | Hunter et al. |
| 2013/0152796 A1 | 6/2013 | Pawl |
| 2013/0153677 A1 | 6/2013 | Leen et al. |
| 2013/0164436 A1 | 6/2013 | Yagi et al. |
| 2013/0172830 A1 | 7/2013 | Hunter et al. |
| 2013/0206857 A1 | 8/2013 | Ivri |
| 2013/0299607 A1 | 11/2013 | Wilkerson et al. |
| 2013/0345672 A1 | 12/2013 | Ferreri et al. |
| 2014/0088524 A1 | 3/2014 | Marx |
| 2014/0113946 A1 | 4/2014 | Abad |
| 2014/0157956 A1 | 6/2014 | Date et al. |
| 2014/0171490 A1 | 6/2014 | Gross et al. |
| 2014/0187969 A1 | 7/2014 | Hunter et al. |
| 2014/0214024 A1 | 7/2014 | Eichler |
| 2014/0224267 A1 | 8/2014 | Levitz et al. |
| 2014/0242022 A1 | 8/2014 | Vehige et al. |
| 2014/0249491 A1 | 9/2014 | Ballou, Jr. et al. |
| 2014/0257172 A1 | 9/2014 | Yalamanchili |
| 2014/0274910 A1 | 9/2014 | Cumberlidge et al. |
| 2014/0276054 A1 | 9/2014 | Hossack et al. |
| 2014/0285121 A1 | 9/2014 | Balogh et al. |
| 2014/0323931 A1 | 10/2014 | Avni |
| 2014/0336596 A1 | 11/2014 | Wochele |
| 2014/0336618 A1 | 11/2014 | Wilkerson et al. |
| 2015/0018781 A1 | 1/2015 | Rinderknect et al. |
| 2015/0035180 A1 | 2/2015 | Shen et al. |
| 2015/0036219 A1 | 2/2015 | Shen et al. |
| 2015/0040891 A1 | 2/2015 | Avni |
| 2015/0086397 A1 | 3/2015 | Ma |
| 2015/0097050 A1 | 4/2015 | Ciervo |
| 2015/0139973 A1 | 5/2015 | Steinfeld et al. |
| 2015/0144128 A1 | 5/2015 | Hijlkema et al. |
| 2015/0209174 A1 | 7/2015 | Abreu |
| 2015/0209178 A1 | 7/2015 | Blakey et al. |
| 2015/0238689 A1 | 8/2015 | Shimizu |
| 2015/0256730 A1 | 9/2015 | Shen et al. |
| 2015/0260179 A1 | 9/2015 | Hatton et al. |
| 2015/0276994 A1 | 10/2015 | Shen et al. |
| 2015/0308421 A1 | 10/2015 | Vogt |
| 2015/0328151 A1 | 11/2015 | Ballou, Jr. et al. |
| 2015/0352297 A1 | 12/2015 | Stedman et al. |
| 2016/0107180 A1 | 4/2016 | Decock et al. |
| 2016/0120833 A1 | 5/2016 | Wan et al. |
| 2016/0129467 A1 | 5/2016 | Ciardella et al. |
| 2016/0199225 A1 | 7/2016 | Ivri |
| 2016/0199230 A1 | 7/2016 | Doshi et al. |
| 2016/0213866 A1 | 7/2016 | Tan |
| 2016/0263314 A1 | 9/2016 | Pardes et al. |
| 2016/0296367 A1 | 10/2016 | Ivri |
| 2016/0354559 A1 | 12/2016 | Gavini et al. |
| 2016/0368009 A1 | 12/2016 | Hatton et al. |
| 2017/0028626 A1 | 2/2017 | Delrot et al. |
| 2017/0136484 A1 | 5/2017 | Wilkerson et al. |
| 2017/0138357 A1 | 5/2017 | Kondo et al. |
| 2017/0151088 A1 | 6/2017 | Ballou, Jr. et al. |
| 2017/0156927 A1 | 6/2017 | Richter et al. |
| 2017/0182510 A1 | 6/2017 | Wilkerson et al. |
| 2017/0187969 A1 | 6/2017 | Kitamori et al. |
| 2017/0274159 A1 | 9/2017 | Gavini et al. |
| 2017/0344714 A1 | 11/2017 | Ballou, Jr. et al. |
| 2018/0085251 A1 | 3/2018 | Hunter et al. |
| 2018/0108275 A1 | 4/2018 | Newberry et al. |
| 2018/0116871 A1 | 5/2018 | Hunter et al. |
| 2018/0207030 A1 | 7/2018 | Ivri et al. |
| 2018/0229247 A1 | 8/2018 | Laidler |
| 2018/0236466 A1 | 8/2018 | Laidler |
| 2018/0297053 A1 | 10/2018 | Buckland et al. |
| 2019/0053945 A1 | 2/2019 | Hunter et al. |
| 2019/0074086 A1 | 3/2019 | Ballou, Jr. et al. |
| 2019/0099071 A1 | 4/2019 | Ehrmann |
| 2019/0314195 A1 | 10/2019 | Ivri et al. |
| 2019/0314196 A1 | 10/2019 | Ivri et al. |
| 2019/0314197 A1 | 10/2019 | Ivri et al. |
| 2019/0314198 A1 | 10/2019 | Ivri et al. |
| 2020/0022416 A1 | 1/2020 | Alarcon |
| 2020/0197218 A1 | 6/2020 | Newell et al. |
| 2020/0197220 A1 | 6/2020 | Ivri |
| 2020/0246182 A1 | 8/2020 | Ivri |
| 2020/0281768 A1 | 9/2020 | Quintana et al. |
| 2020/0315842 A1 | 10/2020 | Palanker et al. |
| 2020/0330267 A1 | 10/2020 | Li et al. |
| 2021/0128350 A1 | 5/2021 | Ivri |
| 2021/0137732 A1 | 5/2021 | Quintana |
| 2021/0220169 A1 | 7/2021 | Ivri |
| 2021/0322209 A1 | 10/2021 | Ivri |
| 2021/0322210 A1 | 10/2021 | Ivri |
| 2022/0039998 A1 | 2/2022 | Ivri |
| 2022/0125631 A1* | 4/2022 | Ianchulev ............... A61P 27/02 |
| 2022/0160542 A1 | 5/2022 | Palanker |
| 2022/0192874 A1 | 6/2022 | Ivri |

(56) References Cited

U.S. PATENT DOCUMENTS

FOREIGN PATENT DOCUMENTS

| | | |
|---|---|---|
| CN | 104582647 A | 4/2015 |
| CN | 204813955 U | 12/2015 |
| CN | 105351426 A | 2/2016 |
| CN | 107530509 A | 1/2018 |
| EP | 0622035 A1 | 11/1994 |
| EP | 0622035 B1 | 3/1999 |
| EP | 1493410 A2 | 1/2005 |
| JP | H08251948 A | 9/1996 |
| JP | 3055480 U | 1/1999 |
| JP | 2007531577 A | 11/2007 |
| JP | 2013535250 A | 9/2013 |
| KR | 10-1258025 B1 | 4/2013 |
| KR | 10-2013-0054352 A | 5/2013 |
| WO | 1994020875 A2 | 9/1994 |
| WO | 9600050 A1 | 1/1996 |
| WO | 1996000050 A1 | 1/1996 |
| WO | 2000005482 A1 | 2/2000 |
| WO | 2001046134 A1 | 6/2001 |
| WO | 2002072169 A2 | 9/2002 |
| WO | 2010078428 A1 | 7/2010 |
| WO | 2012009706 A1 | 1/2012 |
| WO | 2013076682 A1 | 5/2013 |
| WO | 2013090459 A1 | 6/2013 |
| WO | 2013090468 A1 | 6/2013 |
| WO | 2013155201 A2 | 10/2013 |
| WO | 2013158967 A2 | 10/2013 |
| WO | 2016115050 A1 | 7/2016 |
| WO | 2016164830 A1 | 10/2016 |
| WO | 2018136618 A2 | 7/2018 |
| WO | 2018227190 A1 | 12/2018 |
| WO | 2019113483 A1 | 6/2019 |
| WO | 2020010116 A1 | 1/2020 |

OTHER PUBLICATIONS

Denion, et al, 5 Minute Interval Between Two Dilating Eye Drops Increases Their Effect (Year: 2017).*

Brenton, "CRUK/10/30: TRICON8—Sample collection of ovarian cancer tissues and blood for translational research from patients participating in the CR-UK/MRC ICON8 trial", 2015, online abstract.

Pronin et al., "Teaching an Old Drug New Tricks: Agonism, Antagonism, and Biased Signaling of Pilocarpine through M3 Muscarinic Acetylcholine Receptor", 2017, Mol Pharmacol 92:601-612.

Abidi et al., "Lifilegrast: A Novel Drug for Treatment of Dry Eye Disease", Journal of Pharmacology and Pharmacotherapy, 2016, vol. 7, pp. 194-198.

Ali et al., "Glaucoma and Dry Eye", Ophthalmology, 2009, vol. 116, p. 1232.

Birkhoff et al., "New Devices for Dispensing Ophthalmic Treatments May Be the Key to Managing the Life Cycles of Established Products", 2010, Drug Delivery Technology, vol. 10, pp. 16-21.

Choi et al., "Generation of Controllable Monodispersed Sprays Using Impulse Jet and Charging Techniques", Review of Scientific Instruments, 1990, vol. 61, pp. 1689-1693.

Electronic Tutorials, "Linear Solenoid Actuator", 2016 [online]; [Retrieved on Oct. 17, 2022], Retrieved from the Internet <URL: https://www.electronics-tutorials.ws/io/io_6.html>.

Elert, Glenn, "Spherical mirrors", The Physics Hypertextbook, 2021 [online]; [Retrieved on Oct. 17, 2022], Retrieved from the Internet <URL: https://physics.info/mirrors/>.

Gannon, Megan, "The Best Length for Eyelashes, According to Science", Feb. 24, 2015 [online]; [Retrieved on Oct. 17, 2022], Retrieved from the Internet <URL: https://www.livescience.com/49934-optimal-length-for-eyelashes-discovered.html>.

Ianchulev et al., "Pharmacodynamic profile of mydriatic agents delivered by ocular piezo-ejection microdosing compared with conventional eyedropper", 2016, Ther. Deliv., vol. 7, pp. 751-760.

Jow et al., "Design and Optimization of Printed Spiral Coils for Efficient Transcutaneous Inductive Power Transmission", IEEE Transactions on Biomedical Circuits and Systems, 2007, vol. 1, pp. 193-202.

Kent, Christopher, "Getting Meds onto the Eye, 21st Century Style", Mar. 15, 2013 [online]; [Retrieved on Aug. 27, 2019], Retrieved from the Internet <URL: https://www.reviewofophthalmology.com/article/getting-meds-onto-the-eye-21st-century-style>.

Lallemand et al., "Cyclosporine a Delivery to the Eye: A Comprehensive Review of Academic and Industrial Efforts", European Journal of Pharmaceutics and Biopharmaceutics, 2017, vol. 117, pp. 14-28.

Lindblad et al., "Production of Uniform-Sized Liquid Droplets", Journal of Scientific Instruments, 1965, vol. 42, pp. 635-638.

Lux et al., "A Comparative Bioavailability Study of Three Conventional Eye Drops Versus a Single Lyophilisate", Br. J. Ophthalmol., 2003, vol. 87, pp. 436-440.

Macmillan Online Dictionary, "Stream," n.d. [online]; [Retrieved on Dec. 13, 2018]; Retrieved from the Internet <URL: https://macmillandictionary.com/dictionary/american/stream_ 1#stream_ 9>.

Marx et al., "Opthalmic Squeeze Dispenser: Eliminating the Need for Additives in Multidose Preservative-Free Eyecare Formulations", 2017, Drug Development & Delivery, vol. 17, pp. 40-44.

Merriam-Webster, "Clamp," 2019 [online]; [Retrieved on Oct. 25, 2022], Retrieved from the Internet <URL: https://www.merriam-webster.com/dictionary/clamp>.

Merriam-Webster, "Collimate," 2020 [online]; [Retrieved on Oct. 17, 2022], Retrieved from the Internet <URL: https://www.merriam-webster.com/dictionary/collimated>.

Merriam-Webster, "Stream," n.d. [online]; [Retrieved on Dec. 13, 2018], Retrieved from the Internet <URL: https://www.merriam-webster.com/dictionary/stream>.

Murube et al., "Classification of Artificial Tears, I: Composition and Properties", Advanced Experimental Medical Biology, 1998, vol. 438, pp. 693-704.

Murube et al., "Classification of Artificial Tears, II: Additives and Commercial Formulas", Advanced Experimental Medical Biology, 1998, vol. 438, pp. 705-715.

Oxford Online Dictionary, "Stream," n.d. [online]; [Retrieved on Dec. 13, 2018]; Retrieved from the Internet <URL: https://en.oxforddictionaries.com/definition/us/stream>.

Vocabulary.com, "Stream," n.d. [online]; [Retrieved on Dec. 13, 2018]; Retrieved from the Internet <URL: https://www.dictionary.com/stream>.

Kompella et al., "ISOPT Clinical Hot Topic Panel Discussion on Ocular Drug Delivery", 2019, J. Ocul. Pharmacol. Ther., vol. 35, pp. 457-465.

International Search Report and Written Opinion dated Mar. 29, 2021 in corresponding International Patent Application No. PCT/US2020/066169 (7 pages).

"Spherical mirrors" The Physics Hypertextbook. (Year: 2021).

Electronic Tutorials: Linear Solenoid Actuator. (Year: 2016).

Gannon, Megan "The best length for eye lashes" Live Science, Feb. 24, 2015, < https://www.livescience.com/49934-optimal-length-for-eyelashes-discovered.html>. (Year: 2015).

Ianchulev et al., "Pharmacodynamic profile of mydriatic agents delivered by ocular piezo-ejection microdosing compared with conventional eyedropper", 2016, Ther. Deliv. 7(11), 751-760 (Year: 2016).

Kent, Christopher, "Getting Meds onto the Eye, 21st Century Style", Review of Ophthalmology Mar. 15, 2013 (Year: 2013).

* cited by examiner

FRACTIONATED TOPICAL OCULAR DRUG DELIVERY METHODS AND DEVICES FOR USE IN THE SAME

CROSS REFERENCE TO RELATED APPLICATIONS

This application claims the benefit of U.S. provisional patent application 62/934,225, filed on Nov. 12, 2019, and hereby incorporated by reference in its entirety.

This application claims the benefit of U.S. provisional patent application 62/951,903 filed on Dec. 20, 2019, and hereby incorporated by reference in its entirety.

This application claims the benefit of U.S. provisional patent application 63/049,582, filed on Jul. 8, 2020, and hereby incorporated by reference in its entirety.

This application claims the benefit of U.S. provisional patent application 63/011,800, filed on Apr. 17, 2020, and hereby incorporated by reference in its entirety.

This application claims the benefit of U.S. provisional patent application 63/049,110, filed on Jul. 7, 2020, and hereby incorporated by reference in its entirety.

This application claims the benefit of U.S. provisional patent application 63/011,808, filed on Apr. 17, 2020, and hereby incorporated by reference in its entirety.

FIELD OF THE INVENTION

This invention relates to dosing of biological or chemical agents for therapeutic effects.

BACKGROUND

Dose optimization for therapy using chemical or biological agents has been extensively investigated. The usual parameters subject to optimization are the size of each dose and the timing between doses. This dose timing is typically at regular intervals, accommodating for the sleep-wake cycle as needed.

SUMMARY

We have found, unexpectedly, that the efficacy of a dosing regimen can be altered, and preferably improved, by fractionating the doses. Here fractionating the doses can be regarded as taking a single conventional dose and splitting that dose into two or more dose-fractions delivered at relatively short time intervals, where the dose-fractions add up to the same total dose as the conventional dose. Our experimental data show this effect in an ophthalmic application, but it is expected that this effect can occur more generally.

More specifically, a fractionated dosing regimen entails the splitting of a dose into two or more dose-fractions separated by one or more dose-fraction time intervals in a range from 30 seconds to 30 minutes. These dose-fraction time intervals need not be the same for each consecutive pair of dose-fractions.

It is convenient to refer to such a split dose as a "fractionated-dose" having a total administered dose that is the sum of the doses provided by its dose-fractions.

In some embodiments, two or more such fractionated-doses are separated by one or more fractionated-dose time intervals of an hour or more. These fractionated-dose time intervals need not be the same for each consecutive pair of fractionated-doses.

Thus the fractionated-doses are the doses that can have a 'typical' delivery schedule, such as every 4 hours, 5 times a day or the like, and the core idea is that each one of these fractionated-doses is split into the dose-fractions to provide fractionated dosing.

The biological effect (or effects) of a therapeutic agent can be different with fractionated dosing vs. unfractionated dosing. Our results show that in some cases a desirable therapeutic effect is enhanced by fractionated dosing. In cases where the agent has multiple effects, some effects can be increased by fractionation, other effects may be decreased by fractionation, and further effects may be unchanged by fractionation.

DETAILED DESCRIPTION

Section A describes general principles relating to embodiments of the invention. Section B describes experimental evidence for the effect of dose fractionation. Section C describes several variations relating to preferred embodiments.

A) General Principles

Figure 1:
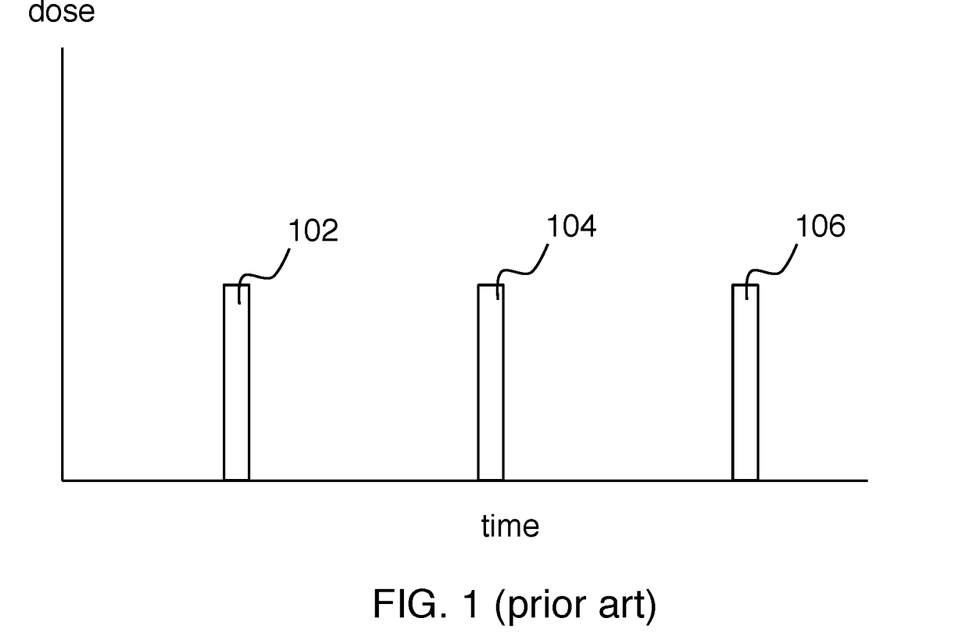
FIG. 1 schematically shows an example of conventional dosing.
Figure 2:
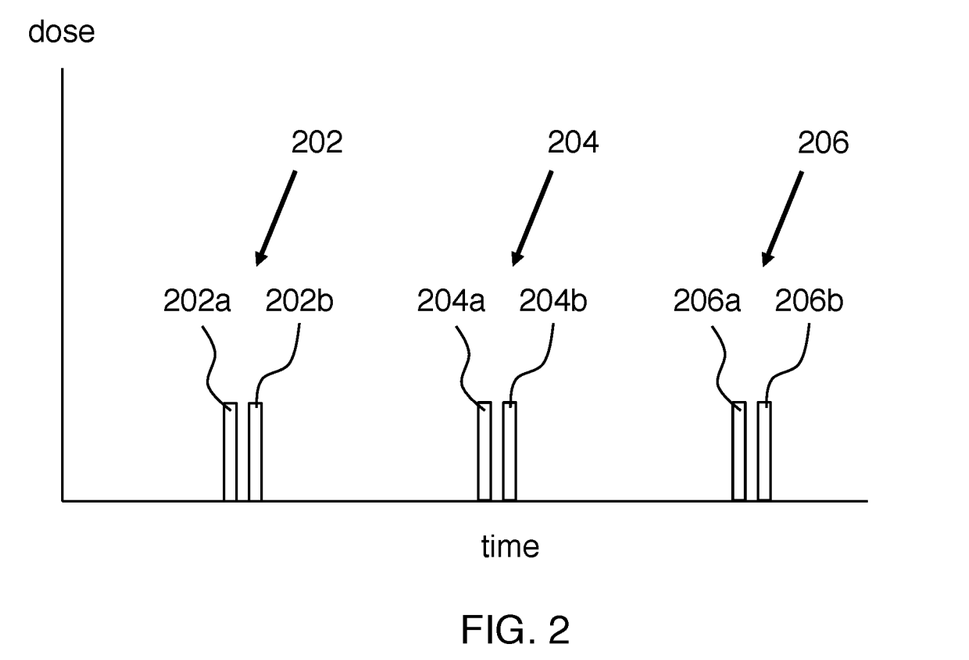
FIG. 2 schematically shows an example of fractionated dosing.

FIG. 1 schematically shows a conventional dosing regimen. Here dosing vs. time is shown for three conventional doses 102, 104, and 106. FIG. 2 schematically shows an example of fractionated dosing. Here a first fractionated-dose 202 is split into two dose-fractions 202a and 202b. Similarly, a second fractionated-dose 204 is split into two dose-fractions 204a and 204b, and a third fractionated-dose 206 is split into two dose-fractions 206a and 206b.

As described in more detail below, we have unexpectedly found, in studies of topical ocular medications in humans, that such dose fractionation can have different (and sometimes better) therapeutic effects compared to conventional single-dosing having the total dose of the dose-fractions delivered in a single dose.

Accordingly, a first embodiment of the invention is a method of delivering a dose of a therapeutic biological or chemical agent to an ocular surface of an eye of a patient, where the method includes delivering the therapeutic biological or chemical agent to the ocular surface of the eye of the patient by fractionating the dose into two or more dose-fractions, and the dose-fractions are separated by one or more dose-fraction time intervals in a range from 10 seconds to 30 minutes.

This first embodiment can further include increasing a therapeutic effect of the therapeutic biological or chemical agent in humans by the dose fractionation.

A second embodiment of the invention is a method of delivering a dose of a therapeutic biological or chemical agent to a patient, where the method includes i) delivering the therapeutic biological or chemical agent to the patient by fractionating the dose into two or more dose-fractions, and the dose-fractions are separated by one or more dose-fraction time intervals in a range from 10 seconds to 30 minutes; and ii) altering one or more biological effects of the therapeutic biological or chemical agent in the patient by the fractionating the dose into two or more dose-fractions.

In this second embodiment, a therapeutic effect of the therapeutic biological or chemical agent in humans can be increased by the dose fractionation.

In both embodiments, the dose-fraction time intervals are preferably in a range between 1 minute and 10 minutes. The therapeutic biological or chemical agent can be a liquid ophthalmic agent, and the dose-fractions can be micro-doses having a volume in a range between 1 µl and 20 µl. Such micro-doses have the advantage of more precise drug delivery to the eye, since their volume can be accommodated by the eye. In contrast, conventional eyedroppers often lead to imprecise dosing because the volume of the dose is too large to be accommodated in the eye and the excess liquid spills out, leading to poor knowledge of the actual delivered dose.

In both embodiments, a fractionated dosing regimen can be used where the fractionated-doses described above are delivered at two or more times separated by one or more fractionated-dose time intervals of an hour or more.

B) Experimental Evidence

Figure 3:
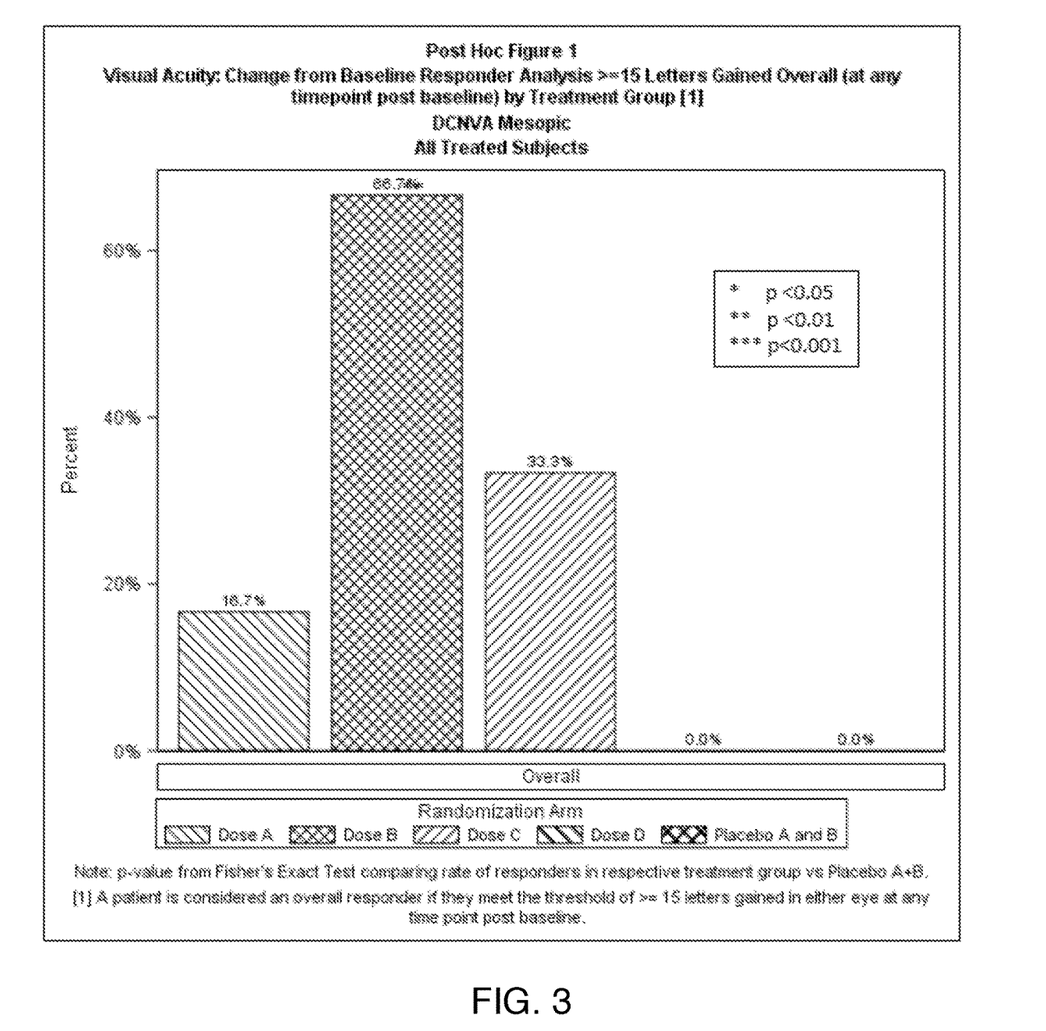
FIG. 3 shows experimental visual acuity results comparing conventional dosing to fractionated dosing.

FIG. 3 shows visual acuity results for various dosing regimens of pilocarpine. Here dose regimen A is single dosing of 1% pilocarpine, dose regimen B is double dosing of 1% pilocarpine, dose regimen C is single dosing of 2% pilocarpine, and dose regimen D is double dosing of 2% pilocarpine. Placebo A and B are single and double doses of saline, respectively. According to the design of this study, dose regimen B is a fractionated dosing regimen relative to the conventional single dosing regimen of dose regimen C, with a dose-fraction time interval of 5 minutes. In other words, the double dosing (fractionation) of dose regimen B provides the same total dose (drug mass) applied to the eye as the single (non-fractionated) dosing of regimen C.

A significant portion (66.7%) of subjects treated with a fractionated microdose of 1% pilocarpine (dose regimen B) gained more than 15 letters of distance corrected near vision compared with baseline distance corrected near visual acuity under both mesopic and photopic illumination conditions. Despite being the same total amount of active drug, the fractionated micro-dose of 1% pilocarpine (dose regimen B) performed significantly better than 1 dose of 2% pilocarpine (dose regimen C) despite the fact that the total amount of drug applied to the surface of the eye within that five minute time interval was the same in all testing conditions (mesopic and photopic lighting conditions). Additionally, double dosing of 2% pilocarpine (dose regimen D) was less effective; 0% of eyes achieved 3 lines of distance corrected near vision improvement versus 33.3% of eyes receiving a single non fractionated dose of 2% pilocarpine in the absence of any evident toxic effects. However compared with a single conventional dose of 1% pilocarpine (group A), a double (fractionated) dose of 1% pilocarpine (group B) resulted in statistically significant improvement in distance corrected near visual acuity. Therefore the results of fractionated dosing are non-linear and non-obvious and dependent on the specific concentration and mechanism of action of the drug used and may be either beneficial or adverse or undetectable as the case may be.

Figure 4:
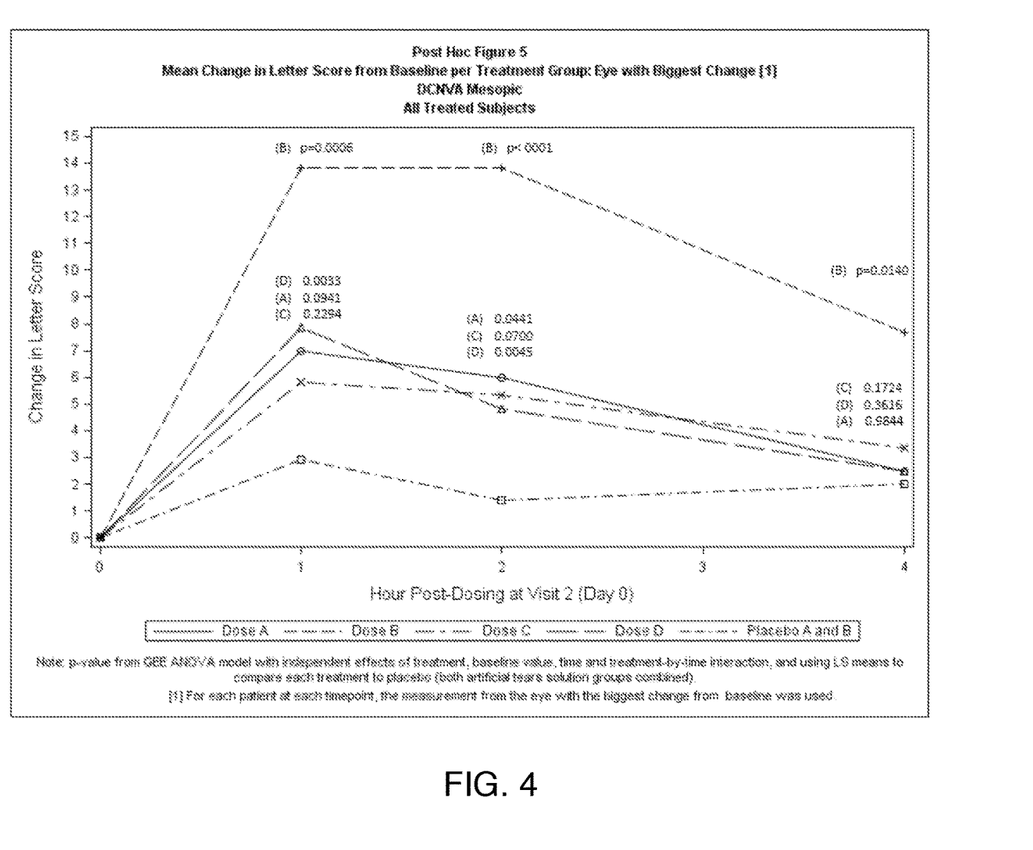
FIG. 4 shows further experimental visual acuity results comparing conventional dosing to fractionated dosing.

Change from baseline DCNVA (distance corrected near visual acuity) was also analyzed per treatment group and time point for both eyes in photopic conditions, as presented in FIG. 4. Again, fractionated micro-dosing with 1% pilocarpine (dose regimen B) resulted in the biggest gain from baseline at all time points. Post hoc analyses showed that these gains in letter score were statistically significantly different from baseline at 1 and 2 hours post-dosing (hour 1 and 2: p<0.001). It is clear that fractionated micro-dosing has increased efficacy over similar amounts of drug (and sometimes higher and lower amounts of drug) at the proper dosing level.

Figure 5:
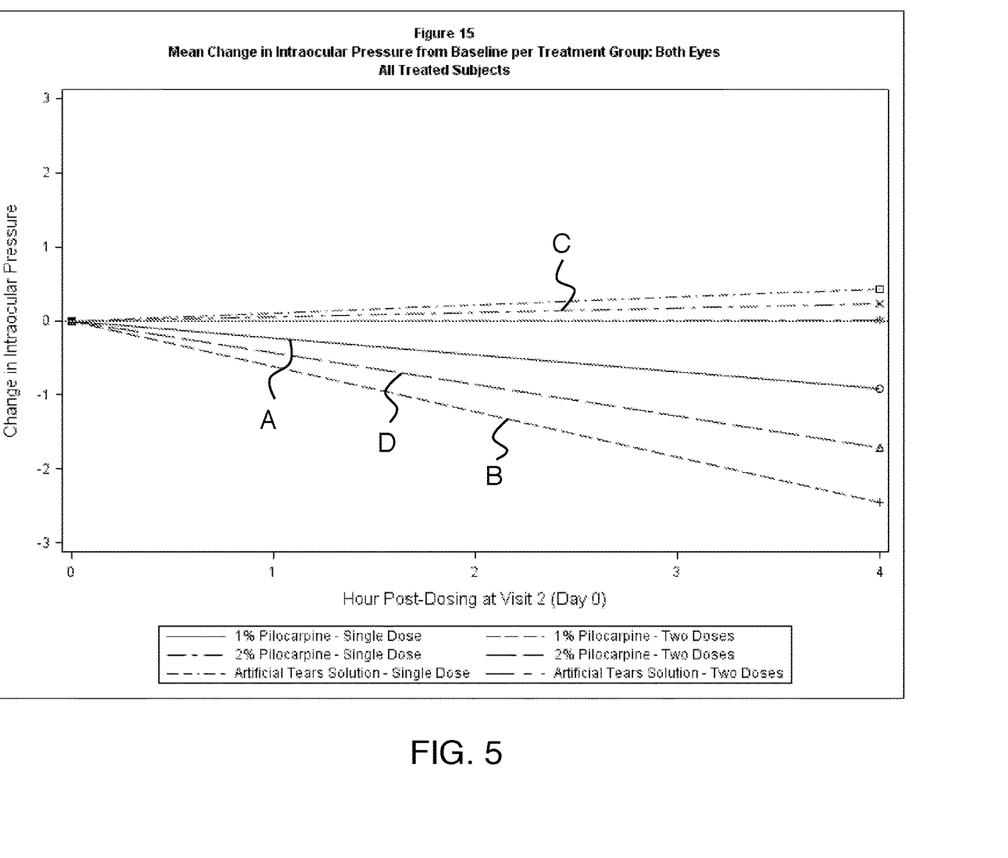
FIG. 5 shows experimental intraocular pressure results comparing conventional dosing to fractionated dosing.

FIG. 5 shows IOP (intraocular pressure) results for the dosing regimens identified above. Again, dosing regimen B (fractionated dosing) performed much better than dosing regimen C (corresponding comparable total dose, not fractionated). However, the IOP results differ from the above visual acuity results in other respects. A particularly noteworthy feature is the null IOP result for dosing regimen C, which is not presently understood. The bottom line appears to be that different therapeutic effects can respond differently to dose-fractionation, even for the same therapeutic agent.

The above results confirm the utility of aspects of the present invention of "fractionated dosing", where more than one lower concentration dose is administered according to a spaced out over an interval of time regimen, resulting in greater effect than a higher concentration dose (or series of doses). This phenomenon is at least in part due to the fact that there is often a concentration dependence to certain effects and side effects, where at lower concentrations a desired effect is seen but with fewer undesired effects, but at higher concentrations, the same effect is seen but with more or new undesired effects. Such undesired effects may not necessarily be adverse effects, just effects that are not desired within a particular context. In the present case, lower concentration pilocarpine given at two doses separated in time had a greater effect on near vision than high concentration pilocarpine at a single or two doses spaced over the same interval. This result suggests that higher concentration pilocarpine exerts certain biological effects outside of pupillary constriction that may interfere with visual-benefits of pupillary constriction, while the lower concentration pilocarpine exerts effects more limited to pupillary constriction and, in turn, near visual acuity. Other types of duty cycles of multiple dosing regimens are possible in this case, including more than two doses separated in time and time intervals of varying duration between the doses.

The discovery that two fractionated doses of an active miotic agent were more effective in achieving a miotic benefit in humans than one dose of a similar concentration is unexpected since our experiments in rabbits do not support that expectation. Additionally our finding that two doses of a higher concentration of cholinergic agent may provide similar or improved miosis yet worsened near visual acuity benefit is also unexpected as demonstrated in our human experiments and indicate an additional mechanism contributing to vision gain or benefit beyond simply pupil size including possible effects on accommodation, position of the lens iris diaphragm, intraocular pressure, neural transduction or other possibilities relating to differential activation of different receptor classes or neuro-physiologic effects for different doses of drug.

Embodiments of fractionated dosing described herein provide a continuous low dose of a drug in which there are discrete separations between low dosage pulses rather than a continuous stream. Literature data (see Kompella et al., "ISOPT Clinical Hot Topic Panel Discussion on Ocular Drug Delivery," J. Ocul. Pharmacol. Ther. (2019) 35(8):457-465) has shown that the anterior chamber concentration of certain drugs reaches a maximum at around 5 minutes. Meanwhile, the ocular surface can only hold about 7-8 microliters at a time but is continuously turned over as tears are produced and drained through the lacrimal system. Therefore, administration of a second dose after a period of about 5 minutes would not only replenish the drug at the ocular surface, but also allow concentration in the anterior chamber again as the intracameral concentration of the drug has begun to decline. In certain embodiments, the second dose is given after the drug is completely cleared from the target tissue (or anatomic space in the body); in other embodiments, it is given when the drug is only partially cleared from the target tissue. In still others, it is given before it has reached its maximal concentration.

For embodiments of the present invention that administer only a small quantity of drug, the amount of bioavailable drug following 2 or more fractionated micro-doses may counter-intuitively provide for greater bioavailability and pharmacodynamics even though the total cumulative dose may only be half of that with one conventional drop. Finally there may also be receptor occupancy effects whereby with the passage of a certain period of time, there may be more than one cycle of activation coupled with fewer off target effects from the larger cumulative drugs not just to the corneal surface but to surrounding tissues in the ocular adnexa, such as the outer lid surfaces, other glands, and tissues that may be impacted by nasolacrimal drainage and reflux. It has been taught that for the case of muscarinic receptors initial binding of cholinergic agonists may allosterically affect the conformation of the M3 and related receptors such that there is a change in the access to or affinity for other binding sites on the receptor for subsequent interaction with cholinergic agents. [Mol Pharmacol. 2017 November; 92(5): 601-612. "Teaching an Old Drug New Tricks: Agonism, Antagonism, and Biased Signaling of Pilocarpine through M3 Muscarinic Acetylcholine Receptor", Alexey N. Pronin, Qiang Wang, and Vladlen Z. Slepak, hereby incorporated by reference in its entirety].

This enhanced pharmacological effect with fractionated drop administration is not limited to the treatment of presbyopia but may also be used with oculo-hypotensive agents, steroids, non-steroidal agents, dry eye treatments, antibiotics, mydriatics, and the like with different targeted receptor types and corresponding classes of chemical and biologic agents beyond muscarinic receptors and cholinergic agents. In addition, the short-interval, fractionated treatments disclosed herein may overcome the need for viscosity enhancing agents that increase retention time on the ocular surface (e.g. hydroxypropyl methylcellulose (HPMC)), and also overcome issues inherent to certain sustained drug release technologies where this continuous delivery of a drug and no time interval allowed for the local tissue environment to return to equilibrium (where the drug has been partially or completely cleared from the target tissue or anatomic space.)

C) Variations

Figure 6:
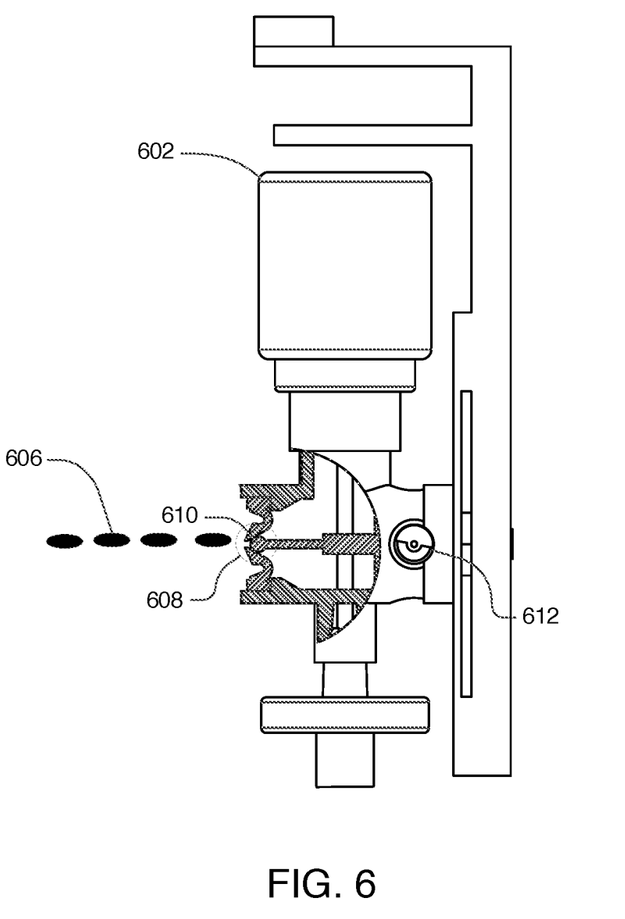
FIG. 6 shows a first example of a preferred handheld dispenser for topical ocular medications.
Figure 7:
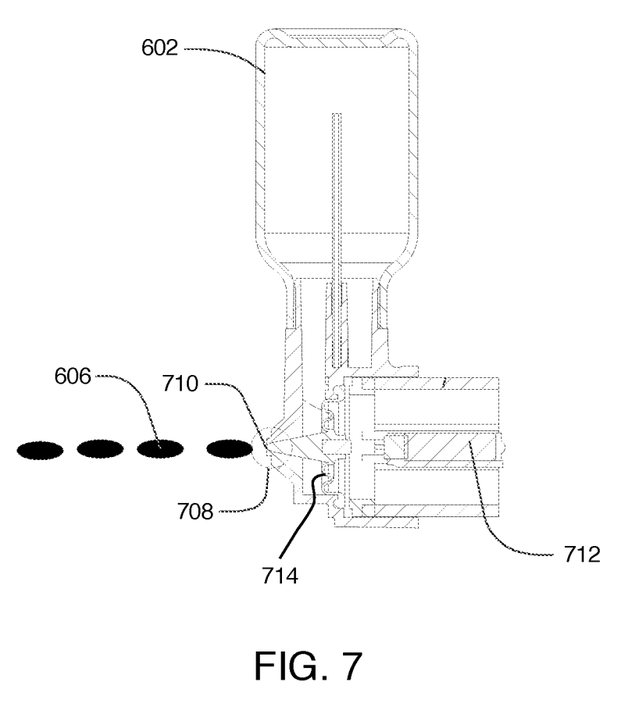
FIG. 7 shows a second example of a preferred handheld dispenser for topical ocular medications.

In preferred embodiments, the therapeutic agent being delivered is a liquid ophthalmic agent that is dispensed using a handheld dispenser. FIG. 6 schematically shows a first example of a suitable handheld dispenser. In the example of FIG. 6, 602 is the drug package, 606 is the emitted fluid, 610 is the valve that keeps aperture 608 normally closed, and 612 is the vibrational motor responsible for generating pressure pules. The example of FIG. 7 is similar, except that valve 710 and aperture 708 have a different configuration, as does the motor 712. The emitted fluid in 606 is depicted as a discontinuous stream of fluid droplets but may also be a continuous stream of fluid droplets, for example when the tail of each drop collides with the head of the following drop. The key difference between the embodiment in FIG. 6 and that of FIG. 7 is that in the FIG. 6. embodiment the vibrating motor is vibrating the entire assembly whereas in the embodiment of FIG. 7 the vibrating motor is only vibrating the membrane 714.

The system is configured to dispense fluid by generating pressure pulses by way of volume displacement or by generation of acoustic pulses from the vibration motor. The pulses may also be generated via a piezoelectric or electromagnetic transducer. In one embodiment the pulses are generated by a vibrational DC motor. The oscillation of the vibrational motor may be transmitted to the fluid through a membrane 714 (FIG. 7) or by oscillating the entire drug fluid package (FIG. 6).

The drug is dispensed from an aperture as a stream of micro-droplets when one or more pulses is exerted onto the fluid in the drug package.

The drug or fluid package can be a blow-fill-seal package or an ampoule containing an ophthalmic formulation.

The drug or fluid package may also include a valve that is configured to normally seal the opening of the aperture to prevent microbial contamination of the fluid within the drug package. The valve opens strictly when fluid is dispensed.

Dose volumes are generally between 7-15 ul. Such volumes generally remain on the eye, however in some embodiments the device is configured to dispense 30-40 ul, which is comparable to a squeeze bottle eye dropper.

The device can further include an electronic circuit that is configured to generate and transmit an electric pulse or wave form to the motor. The circuit may include a timer circuit which determines the length of time that is required to deliver the dose volume.

Accordingly, preferred embodiments of the methods described above include use of a handheld dispenser to provide the liquid ophthalmic agent to the eye(s) of the patient. The handheld dispenser can include: a container configured to hold the liquid ophthalmic agent and having an aperture, where the dispenser is configured to emit the dose-fractions from the container through the aperture.

Various additional features can be provided by the handheld dispenser. The handheld dispenser can be configured to provide a dose-fraction signal when a next dose-fraction is due to be delivered. Similarly, the handheld dispenser can be configured to provide a fractionated-dose signal when a next fractionated-dose is due to be delivered.

The handheld dispenser can be in wireless communication with one or more remote devices to provide functions including but not limited to: remote dose monitoring, remote modification of dose-fraction reminder timing, remote modification of fractionated-dose reminder timing, remote modification of dose-fraction mass delivery, and remote modification of fractionated-dose mass delivery.

Practice of the invention does not depend critically on the nature of the therapeutic biological or chemical agent being delivered. Suitable agents include, but are not limited to: Pilocarpine, artificial tears, latanoprostene, carboxymethylcellulose, propylene glycol, brinzolamide, nepafenac, travoprost, moxifloxacin, netarsudil, ketorolac, proparacaine, tetracaine, tobramycin, brimonidine, bimatoprost, lifitegrast, cyclosporine, gatifloxacin, besifloxacin, dexamethasone, loteprednol, prednisolone acetate, dorzolamide, timolol, azithromycin, bromfenac, levofloxacin, latanoprost, ketotifen, bepotastine, olopatadine, tetrahydrozoline, pheniramine maleate, sodium chloride (Muro), oxymetazoline, naphazoline, hydroxypropylmethylcellulose, cyclopentolate, phenylephrine, and tropicamide, as well as combinations or mixtures thereof.

It should be recognized that in some instances drugs with their primary pharmacologic effect serving as muscarinic agonists for certain receptor subclasses may act as antagonists in certain other cases including when more than one muscarinic agonist is used and there is competition for binding sites for the targeted receptor subclass, or when used alone in interactions with other muscarinic receptor subclasses.

It should also be recognized that the nature of the observed and predicted effects observed for fractional dosing with muscarinic or other designated receptor classes for agonists may also be seen for other therapeutic agents whose primary mode of agent is as antagonists not agonists for the designated receptor including atropine, homatropine, tropicamide, cyclopentolate, scopolamine and related compounds for the treatment of ocular disorders including myopia and related conditions.

The invention claimed is:

1. A method of delivering a microdose of a therapeutic biological or chemical agent to an ocular surface of an eye of a patient, the method comprising:
   determining a total microdose volume of the therapeutic biological or chemical agent to be delivered by a programmable handheld dispenser to the ocular surface of the eye of the patient, wherein the handheld dispenser is programmed to deliver the determined microdose;
   ejecting, from the programmable handheld dispenser, a fraction of the total dose volume, each microdose-fraction having a volume between about 1 µl and about 20 µl;
   determining a time interval to eject one or more subsequent microdose fractions wherein the time interval is less than the time interval at which the ocular surface returns to equilibrium; and delivering, via the programmable handheld dispenser, the total microdose volume by ejecting the microdose fractions as a stream of micro-droplets at the determined time interval, wherein a therapeutic effect is increased by delivering the therapeutic biological or chemical agent in the microdose fractions compared to delivering the total dose volume in a single microdose and wherein a concentration of the therapeutic biological or chemical agent in each microdose-fraction is 50% or less of a concentration of the therapeutic biological or chemical agent delivered in a single microdose.

2. The method of claim 1, wherein the time interval is within 10 seconds and 30 minutes.

3. The method of claim 2, wherein the time interval is between 1 minute and 10 minutes.

4. The method of claim 1, wherein the therapeutic biological or chemical agent is a liquid ophthalmic agent.

5. The method of claim 4, wherein the programmable handheld dispenser includes:
   a container configured to hold the liquid ophthalmic agent and having an aperture, wherein the programmable handheld dispenser is configured to emit each microdose-fraction from the container through the aperture when one or more pulses is exerted onto the liquid in the container.

6. The method of claim 1, further comprising,
   fractionating a second total microdose volume into two or more microdose-fractions, each microdose-fraction having a volume between about 1 µl and 20 µl, and delivering the second total dose as microdose-fractions an hour or more after the total dose volume.

7. The method of claim 1, wherein the programmable handheld dispenser is configured to provide a dose-fraction signal when a next microdose-fraction is due to be delivered.

8. The method of claim 1, wherein the programmable handheld dispenser is configured to provide a total-dose signal when a next total-dose is due to be delivered.

9. The method of claim 1, wherein the programmable handheld dispenser is in wireless communication with one or more remote devices to provide one or more functions selected from the group consisting of: remote dose monitoring, remote modification of microdose-fraction reminder timing, remote modification of fractionated-microdose reminder timing, remote modification of dose-fraction mass delivery, and remote modification of fractionated-microdose mass delivery, and
   wherein the method further comprises providing at least one of the one or more functions via the one or more remote devices.

10. The method of claim 1, wherein the total microdose volume is fractionated into more than two microdose fractions.

11. A method of delivering a microdose of a medication to a patient, the method comprising;
   determining a total dose volume of the medication to be delivered by a programmable handheld dispenser to the patient, wherein the handheld dispenser is programmed to deliver the determined total dose volume in two or more microdose-fractions;
   ejecting, via the programmable handheld dispenser, one of the microdose-fractions, each microdose-fraction having a volume between about 1 µl and about 20 µl;
   wherein the ejecting of each of the microdose-fractions is separated by a time interval until the determined total dose volume is delivered by the programmable handheld dispenser, wherein the time interval is less than the time interval at which an ocular surface returns to equilibrium; altering one or more biological effects of the medication in the patient by the ejecting of the total dose volume into the two or more microdose-fractions; wherein a therapeutic effect is increased by delivering the medication in the microdose fractions compared to delivering the total dose volume in a single microdose and wherein a concentration of the medication in each microdose fraction is 50% or less of a concentration of the medication in a single microdose;
   wherein the programmable handheld dispenser is in wireless communication with one or more remote devices to provide one or more functions selected from the group consisting of:
   remote dose monitoring, remote modification of microdose-fractions reminder timing, remote modification of fractionated-microdose reminder timing, remote modification of microdose-fraction mass delivery, and remote modification of fractionated-microdose mass delivery; and providing at least one of the one or more functions via the one or more remote devices.

12. The method of claim 11, wherein a therapeutic effect of the medication in humans is increased by the fractionating the total dose into the two or more microdose-fractions.

13. The method of claim 11, wherein the time interval is within 10 seconds and 30 minutes.

14. The method of claim 13, wherein the time interval is between 1 minute and 10 minutes.

15. The method of claim 11, wherein the medication is a liquid ophthalmic agent for topical application to an eye of the patient.

16. The method of claim 15, wherein the programmable handheld dispenser includes:
    a container configured to hold the liquid ophthalmic agent and having an aperture, wherein the programmable handheld dispenser is configured to emit the microdose fractions from the container through the aperture when one or more pulses is exerted onto the liquid in the container.

17. The method of claim 11, further comprising,
    fractionating a second total dose volume into two or more microdose-fractions, each microdose-fraction having a volume between about 1 µl and 20 µl, and
    delivering the second total dose volume as microdose-fractions an hour or more after the total dose volume.

18. The method of claim 11, wherein the programmable handheld dispenser is configured to provide a dose-fraction signal when a next microdose-fraction is due to be delivered.

19. The method of claim 11, wherein the programmable handheld dispenser is configured to provide a total-dose signal when a next total-dose is due to be delivered.

20. A method of delivering a microdose of a medication to a patient, the method comprising;
    ejecting, via a programmable handheld dispenser, a fraction of a determined total dose volume into two or more microdose-fractions, each microdose-fraction having a volume between about 1 µl and 20 µl, wherein the handheld dispenser is programmed to deliver the determined microdose; wherein a therapeutic effect is increased by delivering the medication in the microdose fractions over delivering the total dose volume in a single dose, wherein a concentration of active drug in each microdose-fraction is 50% or less of the concentration of the active drug than if delivered to the patient in a single dose, providing a time window within which a subsequent microdose-fraction is ejected; and ejecting, from the programmable handheld dispenser, a series of subsequent microdose-fractions, whereby a time interval between each subsequent microdose-fraction varies, so long as the time interval is within the provided time window, and wherein the time interval is less than the time interval at which the ocular surface returns to equilibrium.

* * * * *